(No Model.)
J. A. MORTON.
MACHINE FOR CLEARING TWIST DRILLS.
No. 337,279. Patented Mar. 2, 1886.
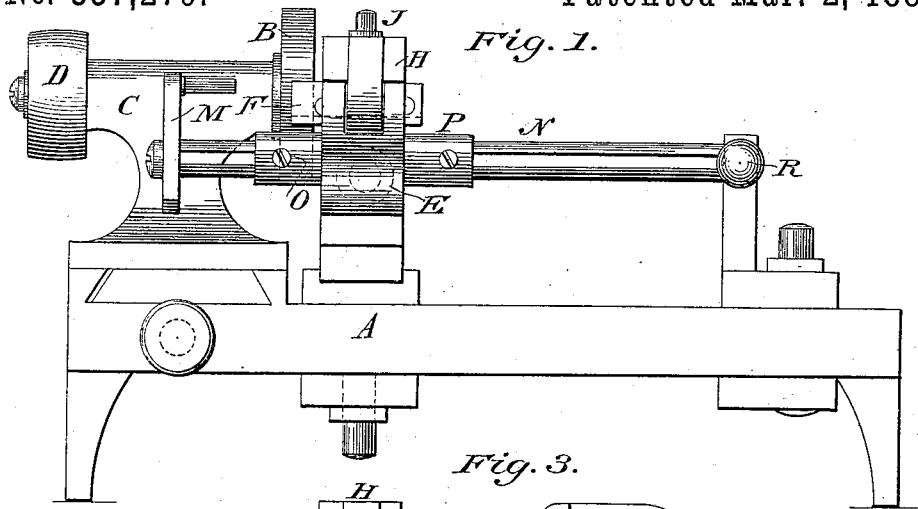
Fig. 1.
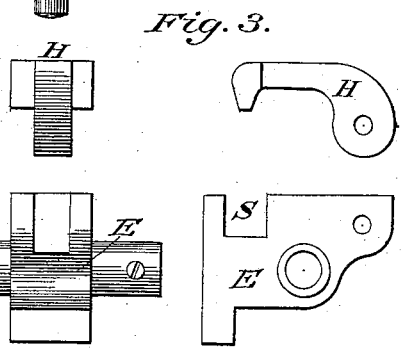
Fig. 3.
Fig. 2.
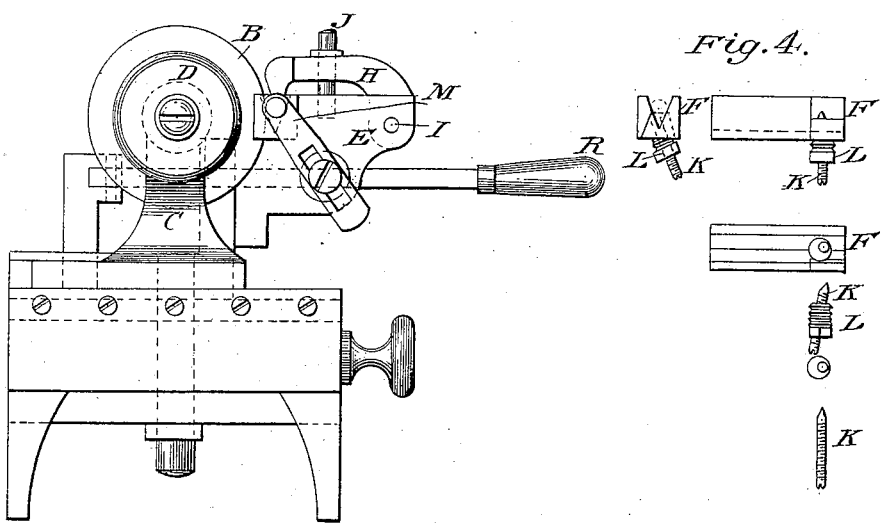
Fig. 4.
Witnesses:
John L. Gibbs
Margaret E. Gibbs
Inventor:
James A. Morton

UNITED STATES PATENT OFFICE.

JAMES A. MORTON, OF NEW BEDFORD, MASSACHUSETTS, ASSIGNOR TO THE MORSE TWIST DRILL AND MACHINE COMPANY, OF SAME PLACE.

MACHINE FOR CLEARING TWIST-DRILLS.

SPECIFICATION forming part of Letters Patent No. 337,279, dated March 2, 1886.

Application filed June 16, 1884. Serial No. 134,965. (No model.)

*To all whom it may concern:*

Be it known that I, JAMES A. MORTON, a citizen of the United States, residing at New Bedford, county of Bristol, and State of Massachusetts, have invented an Improvement in Twist-Drill-Clearing Machines, of which the following is a specification.

My invention relates to improvements in machines for clearing twist-drills, especially the smaller sizes, and has for its object to provide an improvement in the construction and mode of operation of the pin or finger, by means of which the drill is caused to rotate as it passes the clearing-tool, thereby presenting all parts of the land successively for the clearing operation; also to improve the construction of the machines in other respects, as will be hereinafter more specifically pointed out.

Machines of this class as now constructed consist of a suitable frame, with which are connected the following instrumentalities, viz: a suitable clearing-tool, a pair of supporting-jaws, which are ordinarily made adjustable to receive and support the various sizes of drill, and appropriate mechanism for moving the drill longitudinally through the jaws and past the clearing-tool, and also for rotating the drill during its longitudinal motion.

In the accompanying drawings I have represented at Figures 1 and 2 side and end elevations of such a machine. In Figs. 3 and 4 I have illustrated in detail certain features of my invention, as will be hereinafter explained.

I will first briefly describe the operation of machines of the class mentioned, referring for this purpose to the machine shown in the drawings, and will afterward describe specifically those parts to which my present improvements relate.

The operation of these machines is as follows: The rod N and its attached chuck M having been advanced sufficiently beyond the jaw H, the latter is opened, and the butt of the drill is placed between the jaw H and the opposite V-grooved block, F, by means of which it is seized and supported at its butt, leaving that portion of the drill to be cleared outside or beyond the jaw. The chuck M is then brought up by means of the sliding rod N to receive and support the point end of the drill. The clearing-tool B is now brought up and adjusted so as to act upon the desired portions of the drill, and, being set in motion by the pulley D, it gradually grinds or clears away the cylindrical portions of the drill against which it acts. As the clearing-tool continues to rotate, the drill is gradually caused to pass by it, and also by the jaw B, by moving the chuck M and rod N. At the same time the drill is made to rotate by means of a finger or pin, K, entering its groove. In this way the whole of the face of the drill to be cleared is gradually and successively moved before and exposed to the action of the clearing-tool B, and the clearing operation is performed.

I will first describe my improvement in the mechanisms heretofore in use for receiving and supporting the heel of the drill, as above explained. These, as heretofore constructed, consist of a movable upper jaw entering a V-slotted lower jaw, the drill being placed between them. Heretofore it has been customary to hold this upper jaw (represented in the drawings at H) down upon the drill by means of a spring, the tail of the jaw being continued out beyond its pivot I, and the spring being inserted beneath the extended part. I have found it desirable, however, to omit this extension of the jaw, and also to dispense with the spring, and I accordingly form my jaw H as shown, and provide an adjusting-screw, J, by means of which I am enabled to hold the jaw down firmly upon any size of drill which the machine is capable of handling.

I have also improved the part which forms the lower jaw as follows: Heretofore it has been customary to make this part in the form of a circular piece fitted into a block, the idea of this construction being that the capacity of rotation of such a circular piece around its longest axis would facilitate in the adjustment of the pin or finger which it carries. Inasmuch, however, as I have improved the capacity of adjustment of this pin or finger, as will be hereinafter described, I am enabled thereby to make my lower block, F, square in form, thereby obtaining increased cheapness of construction.

I have also further simplified the machine by providing a single part, E, which serves at once as a support for the lower block, F, of the jaw, the upper part of the jaw H, and also the guide-rod N; and I furthermore improve this guide-rod by making it slotted, as shown, and providing screws O, set in sleeves P P, attached to the part E, which screws serve to guide the rod N by entering the slot thereof.

I have also improved the capacity of adjustment of the pin or finger K by mounting it eccentrically within a screw, L, which may be screwed into the block F, so that the pin K will project into the V-shaped slot in order to engage with the groove of the drill lying therein. By reason of this mounting of the pin K, I obtain not only an inward and outward adjustment obtained from the motion of the screw L, but also capacity of circular adjustment of the position of the finger K, by reason of its being eccentrical in the screw L, as shown. This increased capacity of adjustment I find to be of considerable importance in enabling the machine to be used with equal success upon the different sizes of drill.

I claim—

1. In a machine for clearing twist-drills, the combination, with a V-grooved lower block for receiving and supporting the heel of the drill to be cleared, of a pivoted upper jaw, H, arranged to enter the said V-groove, and an adjustment-screw, J, for holding the jaw H firmly in place upon the drill, all substantially as set forth.

2. In a machine for clearing twist-drills, the combination, with a square-formed V-slotted lower block, F, a hinged upper jaw, H, and a rod for imparting motion to the drill in the clearing operation, of a block, E, provided with a square slot, S, to receive the lower block, F, and a circular slot to receive and guide the rod N, the block E also serving as a pivotal support for the jaw H, all substantially as set forth.

3. In a machine for clearing twist-drills, the combination, with the finger or pin which rotates the drill, of an adjusting-screw, L, in which the said finger is set eccentrically, whereby the said finger may be adjusted not only inwardly and outwardly, but also circumferentially, for the purpose set forth.

4. In a machine for clearing twist-drills, the combination of the driver M, the slotted rod N, the sleeve P, and the guide-screws O, all substantially as and for the purpose herein set forth.

5. In a machine for clearing twist-drills, the combination of the driver M, the slotted rod N, the sleeve P, the guide-screws O, and the lever R, all substantially as and for the purposes herein set forth.

6. In a machine for clearing twist-drills, the driver M, in combination with the slotted rod N, the sleeve P, and the guide-screws O, the lever R, and the holder E, all substantially as and for the purpose herein set forth.

7. In a machine for clearing twist-drills, the grooved block F, in combination with the finger K and its adjusting-screw L, and the holder E, all substantially as and for the purpose herein described.

8. In a machine for clearing twist-drills, the grooved block F, in combination with the finger K and its adjusting-screw L, the holder E, and the arm H, all substantially as and for the purpose herein set forth.

9. In a machine for clearing twist-drills, the holder E, in combination with the grooved block F, the arm H, the sleeve P, and the guide-screws O, all substantially as and for the purpose herein described.

JAMES A. MORTON.

Witnesses:
WILLIAM M. BUTLER,
CYREMUS W. HASKINS.